April 17, 1962 — H. P. BISHOP — 3,029,463
VACUUM ACCESSORY FOR BUILT-IN PORTABLE OR OTHER VACUUM
APPARATUS FOR PICKING UP LIQUIDS AND OTHER MATERIALS
Filed Jan. 30, 1959 — 3 Sheets-Sheet 1

INVENTOR
Harold P. Bishop
BY Frease & Bishop
ATTORNEYS

April 17, 1962 H. P. BISHOP 3,029,463
VACUUM ACCESSORY FOR BUILT-IN PORTABLE OR OTHER VACUUM
APPARATUS FOR PICKING UP LIQUIDS AND OTHER MATERIALS
Filed Jan. 30, 1959 3 Sheets-Sheet 2

INVENTOR
Harold P. Bishop
BY Frease & Bishop
ATTORNEYS

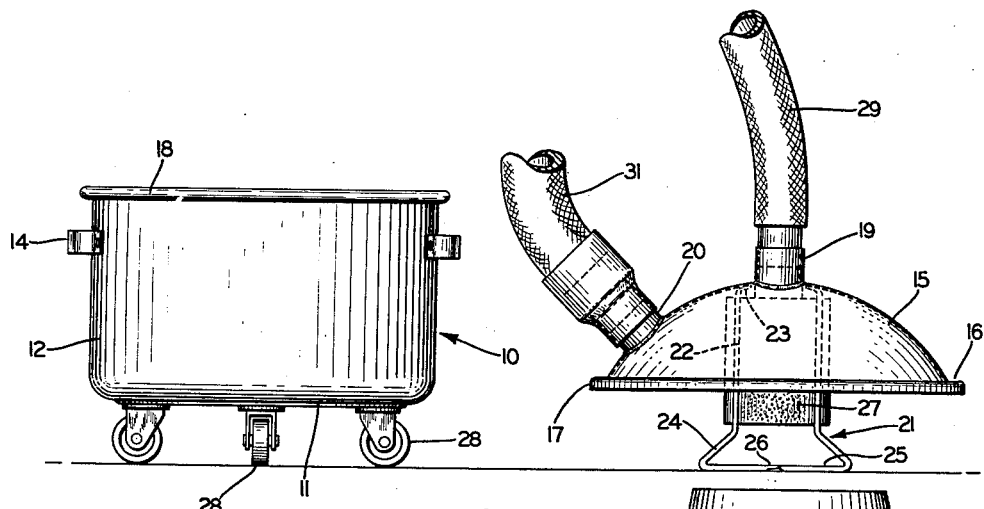
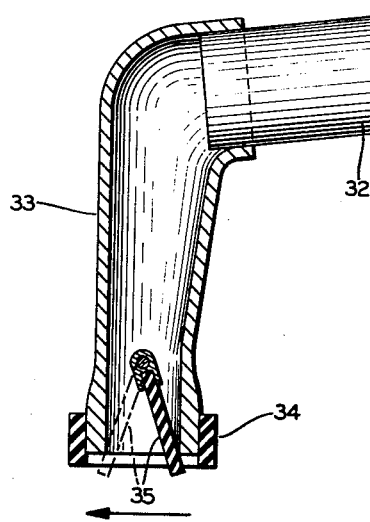
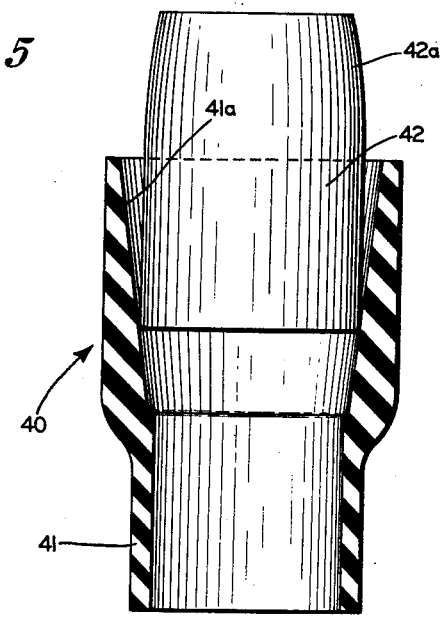

United States Patent Office 3,029,463
Patented Apr. 17, 1962

3,029,463
VACUUM ACCESSORY FOR BUILT-IN PORTABLE OR OTHER VACUUM APPARATUS FOR PICKING UP LIQUIDS AND OTHER MATERIALS
Harold P. Bishop, 512 W. Gorgas St., Louisville, Ohio
Filed Jan. 30, 1959, Ser. No. 790,133
4 Claims. (Cl. 15—353)

The invention relates to vacuum-operated devices for picking up liquids or other materials, and more particularly to a device of this character comprising an accessory for a built-in vacuum system, or for a portable or other type of vacuum apparatus, such as tank-type, canister-type and floor-type vacuum cleaners.

The object of the invention is to provide a device of the character referred to comprising a pan or receptacle for liquids and the like and a detachable cover therefor having an outlet connection for attachment by flexible hose to an inlet to a built-in vacuum system, or a portable or other type of vacuum cleaning apparatus, and an inlet connection for attachment of a hose with a tool thereon for picking up liquids and other materials.

Another object of the invention is to provide a device of this character in which the cover is held in air-tight sealed relation upon the pan or receptacle by the suction alone, thus eliminating the necessity of clamps or other fastening means for the cover.

A further object of the invention is to provide such a device having a float formed of a very light-weight, non-absorbent, flexible, foam-type material which may be plastic or other suitable material which is sufficiently light to float upon liquid or soap suds, or detergent foam floating upon the surface of water in the pan or receptacle, so that the float will automatically close the suction outlet before the liquid level reaches the top of the pan or receptacle.

It is also an object of the invention to provide a device of the character referred to in which the cylindrical float is loosely located within a wire cage which guides the float toward the suction outlet in the cover.

A further object of the invention is to provide a device of this character in which the wire cage and the flexible float are so constructed that the float may be easily and readily removed from between the wires of the cage for repairs or replacement, and as easily replaced therein without the necessity of removing the permanently mounted wire cage.

Another object of the invention is to provide a device of this type in which the wire cage for the float bells out at the bottom so as to more easily remove or replace the flexible float, and also in order that, when the cover is removed from the pan it may be set on the floor, resting upon the flat bottom of the wire cage, the wire cage having a minimum contact with the floor with no sharp edges to mar the floor surface.

A further object of the invention is to provide a device of this character in which the inner end of the suction inlet tube is located at such an angle that the intake will blow against the float and toward the bottom of the pan, directing liquids or other materials inward and downward to the bottom of the pan, out of the air stream so that liquids will not be picked up and carried into the vacuum outlet line to the vacuum apparatus.

A still further object of the invention is to locate the inner end of the inlet tube at such an angle that the intake will be directed against the flexible float to keep the same activated, so that it will easily rise on liquid or soap suds or detergent foam on the top of the water level.

It is also an object of the invention to provide such an apparatus with the outer end of the inlet tube located at such an angle that will permit the inlet hose to pull out without upsetting the pan, if there is a sudden pull or jerk on the hose.

Another object of the invention is to provide a device of this character in which both the inlet and outlet connections are on the cover, so that the cover can be removed to empty the pan or receptacle without disconnecting either hose from the device or from the vacuum apparatus.

Still another object of the invention is to provide a device of the character referred to in which a squeegee tool may be attached to the suction hose for picking up water, soap suds, detergent foam, dry cleaner used for cleaning carpets, upholstery and the like, or for picking up water or other liquid from floors or other surfaces, and in which a conventional tool may be used for picking up dry materials that it would be undesirable to run through a built-in vacuum apparatus or a portable or other type of vacuum cleaner.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms the invention may be briefly described as comprising an accessory adapted to be connected to a power-operated vacuum apparatus, such as either a built-in vacuum system or any portable vacuum cleaning apparatus, such as a canister-type, tank-type or floor-type vacuum cleaner, or other type of vacuum apparatus; and for picking up liquids and/or dry materials which it would be undesirable to pass through a vacuum cleaner apparatus.

The accessory comprises a pan or receptacle which may be of generally cylindrical shape, and a detachable cover for the pan, the cover preferably being of dome shape. Means is provided for forming an air-tight seal between the cover and the receptacle.

The cover is adapted to be tightly attached to the receptacle solely by suction passing therethrough, so that no clamps or other attaching means are necessary for holding the cover tightly upon the receptacle. When the suction is shut off, the cover may be easily and readily removed from the receptacle.

An inlet tube is located through the top of the cover and adapted to be connected by a hose to an inlet of a built-in vacuum system, or to the inlet of a portable vacuum cleaning apparatus such as a canister-type, tank-type or floor-type vacuum cleaner, or to the inlet of any other form of vacuum-producing apparatus.

A wire cage surrounds the outlet tube and extends downward into the pan. This wire cage is formed of two substantially U-shaped wire members, the lower portion of each U-shaped member being belled. The wire cage is attached at its upper end to the underside of the cover, and a float is movably located within the cage. This float is preferably of cylindrical shape and formed of a light-weight, non-absorbent material, preferably cellular foam plastic material, characterized by a multiplicity of non-communicating cells throughout its area.

The float is of such light weight that it will float upon liquid or soap suds, or detergent foam above the level of liquid in the receptacle so as to seat against the suction outlet tube and shut off the suction to the device before the liquid level reaches the top of the receptacle.

The wire cage for the float is flat upon the bottom, so that when the cover is removed from the receptacle it may be placed upon the floor, resting upon the wire cage. The cage has a minimum contact with the floor and has no sharp edges to mar the floor.

The float is flexible so that it will form an air-tight seal with the end of the outlet tube, when moved up to the closed or shut-off position. This flexibility of the float, as well as the bell shape and the flexibility of the wire cage, permits the float to be easily and readily removed from the wire cage or replaced therein when repairs or replacement of the float may be necessary.

An inlet tube is located through the cover preferably at substantially 45° to the vertical axis of the receptacle. Although the inner end of this inlet tube is located at about 45°, the outer end thereof, to which the inlet hose is connected, may be located at any angle from horizontal to about 60°, to the horizontal, so as to permit the inlet hose to pull out of the inlet tube without upsetting the device, if there is a sudden pull on the hose.

A flexible hose is attached to the inlet tube and provided at its free end with a suction tool which may be a special squeegee-type of tool for picking up liquids, or a conventional tool for picking up dry materials.

If the accessory is to be used for picking up dry materials, which it would be undesirable to pass through a power-operated vacuum apparatus or vacuum cleaner, a conventional tool may be attached to the inlet hose.

By locating the inner end of the inlet tube at about a 45° angle, the intake is directed downward toward the bottom of the receptacle, so that the liquids or other materials are directed inward and down to the bottom of the receptacle, out of the air stream, so that the liquids, etc. will not be picked up by the air stream and carried into the outlet vacuum line to the vacuum apparatus.

This angle of the inlet tube also directs the intake against the float, so as to keep the same activated in order that it will easily rise on liquid or foam, soap suds and the like upon the top of the liquid level in the receptacle.

The above-described angle of the outer end of the inlet tube also permits the inlet hose to pull out of the inlet tube without upsetting the device if there is a sudden pull on the hose.

The receptacle may be provided with casters so that it may be easily moved over the surface of the floor, or it may be placed upon a dolly having casters thereon.

Where the accessory is used in connection with a portable vacuum cleaner, such as a canister-type, tank-type or floor-type vacuum cleaner, both the accessory and the vacuum cleaner may be placed upon a dolly of suitable size so that the two devices as a unit may be moved over the surface of the floor.

A preferred embodiment of the invention is illustrated in the accompanying drawings, in which:

FIG. 5 is a side elevation showing the receptacle or pan with the cover removed and placed upon the floor, supported upon the wire cage thereof;

FIG. 6 is a vertical sectional view through the special squeegee tool for picking up liquids; and FIG. 7 is a longitudinal sectional view through the universal adapter by means of which the flexible hose of any type of portable vacuum cleaner may be attached to the outlet tube of the device.

Figure 2:
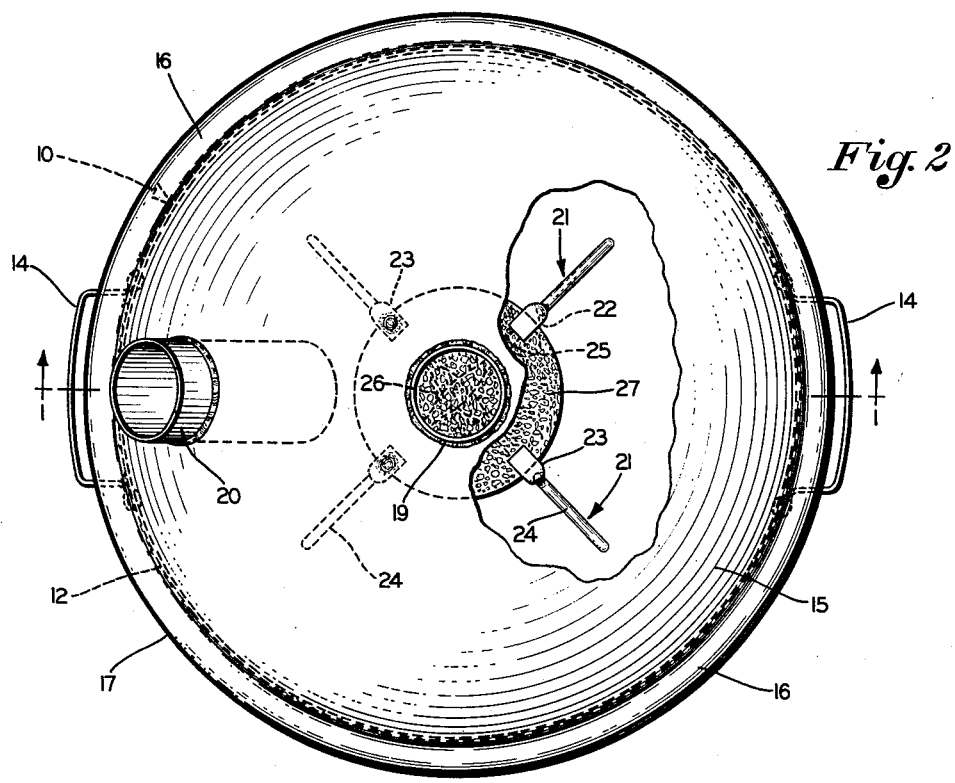
FIG. 2 is a top plan view of the device shown in FIG. 1, with parts of the cover broken away for purposes of illustration.
Figure 1:
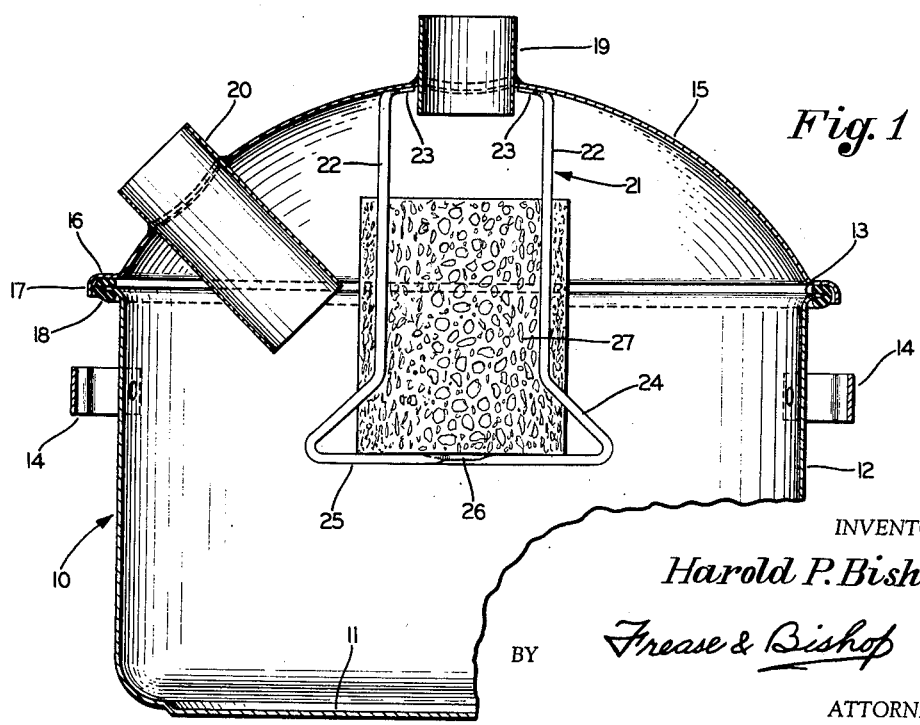
FIG. 1 is a vertical sectional view through an accessory vacuum apparatus for picking up liquids and other materials, constructed in accordance with the invention.

Referring now more particularly to the embodiment of the invention illustrated, the accessory vacuum apparatus to which the invention pertains comprises a pan or receptacle 10, which may be of generally cylindrical shape having the flat bottom wall 11 and cylindrical side walls 12, terminating at the upper open end in an out-turned annular flange 13. Handles 14 may be provided upon the pan 10 for manually handling the same.

The cover 15 is detachable from the receptacle and is preferably of dome-shape as shown in the drawings, having the peripheral out-turned flange 16, terminating in the downturned annular flange 17 adapted to fit over the gasket 18 of rubber or the like, located upon the annular flange 13 of the receptacle, in order to form an air-tight seal between the receptacle and the cover.

If desired, the sealing gasket may be mounted within the flange 16—17 of the cover, to seat upon the flange 13 of the receptacle, in order to form an air-tight seal therebetween. Both the receptacle and the cover may be formed of sheet metal or other suitable material.

An outlet tube 19 is centrally located through the top of the cover, and an inlet tube 20 is located therethrough, the inner end thereof being located at an angle of about 45° to the vertical axis of the device, through one side of the cover. The outer end of the inlet tube 20 may be located at any angle from horizontal to 60° to the horizontal, so as to permit the hose to pull out without upsetting the device, if there is a sudden pull or jerk on the hose.

A wire cage surrounds the outlet tube 19, on the underside of the cover, and extends downward into the receptacle. This wire cage is formed of two similar substantially U-shaped wire members 21 located at right angles to each other. Each of the wire members 21 comprises the straight vertical legs 22, having inturned flattened flanges 23 at their upper ends which are attached to the underside of the cover 15, as by brazing or the like.

The lower end of each straight leg 22 is belled outward as at 24, and the lower end of each U-shaped wire member 21 is located horizontally, as indicated at 25, the central portions thereof being flattened as at 26, and soldered or otherwise connected together.

A float 27 is movably located within the wire cage thus formed and normally rests upon the flat bottom portions 25 of the wire members 21. This float is preferably of cylindrical shape and is formed of a very light-weight, non-absorbent, cellular foam-type material which may be a plastic material like Styrofoam.

This is a cellular material characterized by non-communicating cells located throughout its area, and is sufficiently light that it will float on water on other liquid, or on the suds or foam caused by soap, detergent and the like in the water.

Figure 3:
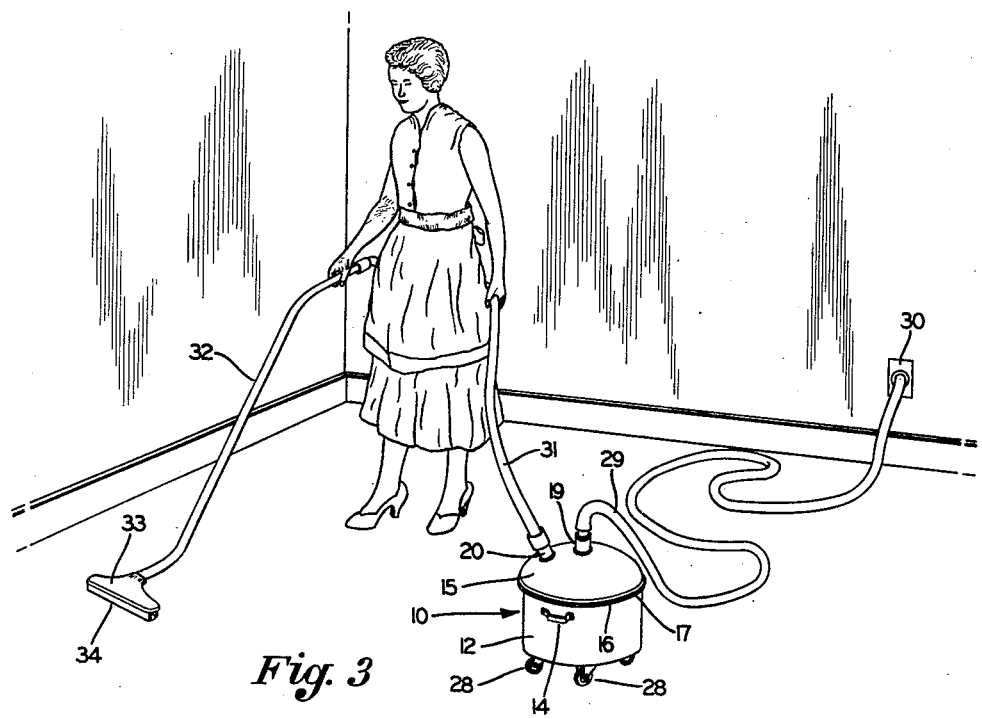
FIG. 3 is a perspective view showing the accessory vacuum apparatus in use, the outlet tube being connected by a hose to a wall inlet for a built-in vacuum system, and a squeegee tool being connected to the inlet hose for picking up liquids.

The receptacle 10 may be mounted upon casters, as indicated at 28 in FIGS. 3 and 5, and in lieu of the casters the receptacle may be detachably mounted upon a dolly provided with casters so that it may be moved around the floor in the same manner as a canister-type portable vacuum cleaner.

As shown in FIG. 3, the outlet tube 19 is adapted to be connected by a flexible hose 29 to an inlet 30 of a built-in vacuum system. A flexible inlet hose 31 is adapted to be attached to the inlet tube 20 and may be connected to a conventional tubular wand 32, upon which a cleaning tool is attached.

The cleaning tool, as indicated at 33 in FIGS. 3 and 6, may be a squeegee-type of cleaning nozzle having the depending straight soft rubber band 34 surrounding the lips of the suction nozzle 33.

As best shown in FIG. 6, a pivoted or floating center wiper 35, formed of soft rubber or the like, may be located within the nozzle of the squeegee tool 33, and adapted to move against the rear lip of the nozzle, as shown in full lines, when the tool is moved forwardly upon a floor surface, and to move against the forward lip of the nozzle, as shown in broken lines, when the tool is moved rearwardly.

If it is desired to use the invention for picking up dry materials which it would be undesirable to pass through the vacuum apparatus, or vacuum cleaner, a conventional nozzle tool may be substituted for this squeegee tool.

Figure 4:
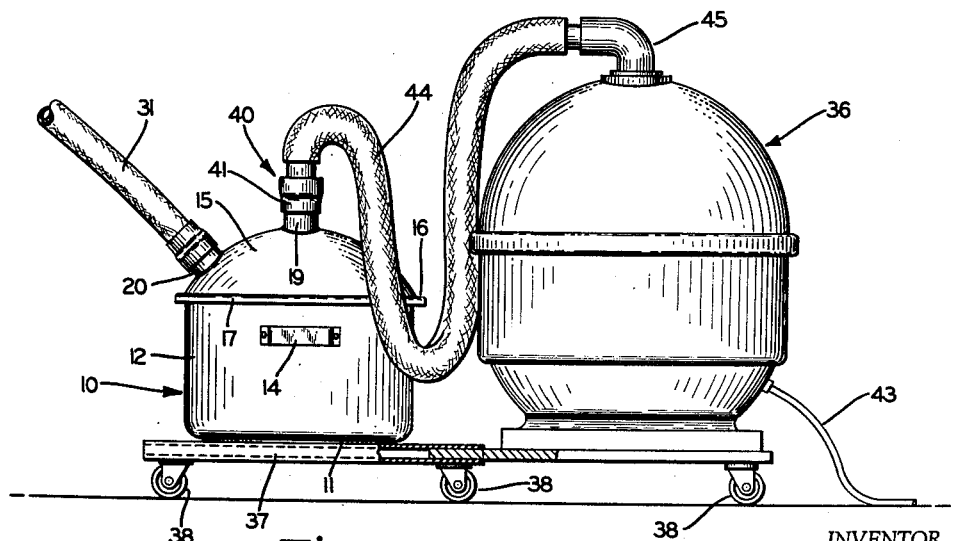
FIG. 4 is a side elevation showing the accessory vacuum apparatus and a canister-type vacuum cleaner mounted upon a dolly, the outlet tube of the accessory device being provided with an universal adapter whereby the outlet tube may be connected to the inlet tube of the canister-type vacuum cleaner or any other vacuum cleaner, by a flexible hose.

As shown in FIG. 4, the accessory to which the invention pertains may be connected to a portable-type vacuum cleaner instead of to an inlet of a built-in vacuum system.

For the purposes of illustration, a canister-type portable vacuum cleaner is indicated generally at 36, and both the receptacle 10 with cover 15 thereon, and the portable vacuum cleaner 36, may be mounted as a unit upon a dolly 37 provided with casters 38 so that the two devices may be moved as a unit upon the floor.

As shown in FIG. 4, the dolly 37 may be of telescoping or collapsible construction, so as to accommodate both the accessory and a portable vacuum cleaner of various sizes, and whereby when not in use, the dolly may be collapsed to take up only a minimum amount of storage space.

In using the invention in this manner, a universal adapted indicated generally at 40, is attached to the outlet tube 19, so as to accommodate the hose connection of the suction hose of most types of portable vacuum cleaners.

As best shown in FIG. 7, this universal adapter has the cylindrical neck 41 for attachment to the outlet tube 19 of the accessory, and is provided with the upwardly flared opening 41a so that hose connections of various diameters may be wedge-fitted therein to provide an air-tight connection.

One type of hose connection now in use is provided with a clamp or clip on the exterior thereof which prevents the hose connection from being inserted into the flared upper end 41a of the universal adapter 40. For this purpose, an auxiliary adapted 42 is provided, in the form of a tube for insertion into the flared neck 41a of the universal adapter 40. The upper end of the auxiliary adapter 42 may be tapered at 42a to permit such hose connections to be located thereover.

In using the invention in the manner shown in FIG. 4, the conventional flexible electric cord 43 of the portable vacuum cleaner 36 is plugged into a wall receptacle in usual manner, and the flexible suction hose 44 is connected at opposite ends to the universal adapter 40 on the outlet tube of the accessory device and to the inlet connection 45 of the vacuum cleaner.

Although a canister-type vacuum cleaner is indicated at 36 in FIG. 4, it should be understood that a tank-type vacuum cleaner, or floor-type vacuum cleaner may be mounted upon the dolly 37 with the accessory 10–15, and connected theerto by flexible hose in the manner shown in FIG. 4 and above described.

In the operation of the accessory device 10–15, when suction is applied to the outlet tube 19, water or other material picked up by the tool 33 will be drawn through the suction hose 31 and discharged through the inlet tube 20 downwardly to the bottom of the receptacle 10, out of the air stream passing upwardly through the outlet tube 19 to the built-in vacuum system or vacuum cleaner, as the case may be. This prevents water or moisture from being drawn up through the outlet tube and into the vacuum apparatus.

The intake thus passing down at an angle through the inlet tube 20 will contact the float 27, keeping it activated so that it will float upon the liquid level in the receptacle 10, or if there is suds or foam upon the top of the liquid, it will float upon the top of the suds or foam.

As the float 27 rises, it will ultimately contact the lower end of the outlet tube 19 before the water level reaches the top of the receptacle 10. The suction from the vacuum apparatus will cause the soft flexible float 27 to tightly contact the lower end of the outlet tube 19 entirely shutting off the suction.

During the time that the suction is passing through the accessory device, the cover 15 will be tightly held upon the receptacle solely by suction, so that an air-tight joint is provided between the receptacle and the cover.

When the pan or receptacle 10 has been filled with liquid, suds or foam, and the suction has been shut off by the float 27 contacting the outlet tube 19, the suction is broken and the cover may be easily and readily lifted off of the receptacle and placed upon the floor, resting upon the flat bottom portion 25 of the wire cage, as shown in FIG. 5, without detaching either hose from the cover, and without detaching either hose 29 or 44 from the receptacle 30 or the inlet of the vacuum cleaner 36, as the case may be.

Since the wire cage has a minimum of surface for contact with the floor and has no sharp edges thereon, the floor surface will not be marred when the wire cage contacts the same, as shown in FIG. 5.

The receptacle 10 may be emptied, after which the float 27 is manually moved down into open position and the cover may be placed upon the receptacle and the operation repeated.

If at any time it is necessary to remove the float 27 to repair or replace the same, this may be accomplished by bending the lower end of the flexible float and pulling adjacent wires of the wire cage slightly apart so as to pull the float therebetween. The float may be as easily replaced in the wire cage.

It will be obvious that the accessory vacuum device forming the invention will have many uses. Water spilled upon a floor from an overflowed sink, wash basin, bathtub or the like may be easily and readily picked up and disposed of without damage to the vacuum apparatus or vacuum cleaner.

Cement, tile or linoleum-covered floor surfaces may be scrubbed with soap suds or detergent in usual manner, after which the water and suds or foam may be quickly and easily picked up by use of the squeegee tool, leaving the floor surface substantially dry.

Carpets may be scrubbed with suitable soap, detergent or dry cleaner, and the suds, foam and liquid may then be picked up with the use of a conventional rug tool, the suction drawing the maximum amount of moisture out of the carpet so that it will quickly dry.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. An accessory device for a vacuum apparatus for picking up liquids and other materials, said accessory device comprising a receptacle, a removable cover, means providing an air-tight seal between the receptacle and the cover, a suction outlet tube centrally located in the top of the cover, a hose connected to the suction outlet tube, an inlet tube in the cover, an inlet hose with a pick-up tool thereon, said inlet hose being connected to said inlet tube for discharging liquids and other materials into the receptacle, a cage attached to the cover and concentrically surrounding the suction outlet tube and extending into the receptacle, said cage comprising two substantially U-shaped wire members located at 90° to each other and having flat bottom portions whereby the cover may be supported upon a horizontal surface with only the flat bottom portions of said U-shaped wire members contacting said horizontal surface, and a light-weight, non-absorbent float movably located within and freely movable in any direction within said cage, said float being formed of a cellular foam-type plastic material characterized by a multiplicity of non-communicating cells throughout its area and being of such light weight that it will float upon liquid, soap suds and detergent foam above the level of liquid in the receptacle so as to seat against said suction outlet tube before the liquid level reaches the top of the receptacle, said inlet tube being located at an angle to the vertical axis of the receptacle so that the intake therefrom will be directed against the float to activate the float so that it will float upon the top of suds and foam upon the top of the liquid.

2. An accessory device for a vacuum apparatus for picking up liquids and other materials, said accessory device comprising a receptacle, a removable cover, means providing an air-tight seal between the receptacle and the cover, a suction outlet tube in the top of the cover, a hose connected to the suction outlet tube, an inlet tube in the cover, an inlet hose with a pick-up tool thereon, said inlet hose being connected to said inlet tube for discharging liquids and other materials into the receptacle, a cage attached to the cover surrounding the suction outlet tube and extending into the receptacle, and a light-weight, non-absorbent float movably located within said cage, said float being formed of a cellular material characterized by a multiplicity of non-communicating cells throughout its area and being of such light weight that it will float upon liquid, soap suds and detergent foam above the level of liquid in the receptacle so as to seat against said suction outlet tube before the liquid level reaches the top of the receptacle, said inlet tube being located at an angle to the vertical axis of the receptacle so that the intake therefrom will be directed against the float to activate the float so that it will float upon the top of suds and foam upon the top of the liquid.

3. An accessory device for a vacuum apparatus for picking up liquids and other materials, said accessory device comprising a receptacle, a removable cover, means providing an air-tight seal between the receptacle and the cover, a suction outlet tube centrally located in the top of the cover, a hose connected to the suction outlet tube, an inlet tube in the cover, an inlet hose with a pick-up tool thereon, said inlet hose being connected to said inlet tube for discharging liquids and other materials into the receptacle, a cage attached to the cover and concentrically surrounding the suction outlet tube and extending into the receptacle, said cage comprising a pair of substantially U-shaped wire members located at 90° to each other, the lower portions of said U-shaped members being belled and the bottom portions of said U-shaped members being straight so as to provide a relatively large flat bottom upon the cage, whereby the cover may be supported upon a horizontal surface with only the flat bottom portions of said U-shape wire members contacting said horizontal surface and a light-weight, non absorbent float movably located within said cage, said float being formed of cellular material characterized by a multiplicity of non-communicating cells throughout its area and being of such light weight that it will float upon liquid, soap suds and detergent foam above the level of liquid in the receptacle so as to seat against said suction outlet tube before the liquid level reaches the top of the receptacle, said inlet tube being located at an angle to the vertical axis of the receptacle so that the intake therefrom will be directed against the float to activate the float so that it will float upon the top of suds and foam upon the top of the liquid, said float being flexible so that it may be removed from the cage by flexing the float and pulling it between wires of the cage.

4. In combination with a portable vacuum cleaner having an inlet connection, an accessory device for picking up liquids and other materials, said accessory comprising a receptacle and a removable cover therefor, means providing an air-tight seal between the receptacle and cover, a suction outlet tube in the cover, a rubber-like universal adapter upon said suction outlet tube having a tapered socket therein for insertion of hose connections of various diameters, a hose connecting said universal adapter on the suction outlet tube to the inlet connection of the vacuum cleaner, a downwardly and inwardly inclined inclined inlet tube in the cover, a hose with a pick-up tool thereon, said last-named hose being connected to said inlet tube for discharging liquids and other materials into the receptacle, a wire cage on the cover surrounding the suction outlet tube, and a float movably located in said cage, said float being formed of a cellular material characterized by a multiplicity of non-communicating cells throughout its area and being of such light weight that it will float upon liquid, soap suds and detergent above the level of liquid in the receptacle so as to seat against said suction outlet tube before the liquid level reaches the top of the receptacle, said inlet tube being located at an angle to the vertical axis of the receptacle so that the intake therefrom will be directed against the float to activate the float so that it will float upon the top of suds and foam upon the top of the liquid, said inlet tube terminating at a point adjacent to the float.

References Cited in the file of this patent

UNITED STATES PATENTS

| 950,533 | Hilliard | Mar. 1, 1910 |
|---|---|---|
| 2,375,406 | Drown | May 8, 1945 |
| 2,528,375 | Lilly | Oct. 31, 1950 |
| 2,549,181 | Durham | Apr. 17, 1951 |
| 2,649,927 | Ortega | Aug. 25, 1953 |
| 2,660,194 | Hoffman | Nov. 24, 1953 |
| 2,703,152 | Petersen | Mar. 1, 1955 |
| 2,718,404 | Burskey | Sept. 20, 1955 |

FOREIGN PATENTS

| 42,318 | Switzerland | Mar. 21, 1908 |
|---|---|---|
| 661,636 | Great Britain | Nov. 21, 1951 |